Feb. 20, 1968     F. L. MURDOCK     3,369,347
UP FLOW ELECTRIC EMULSION TREATER FOR CRUDE OIL
Filed Oct. 22, 1965
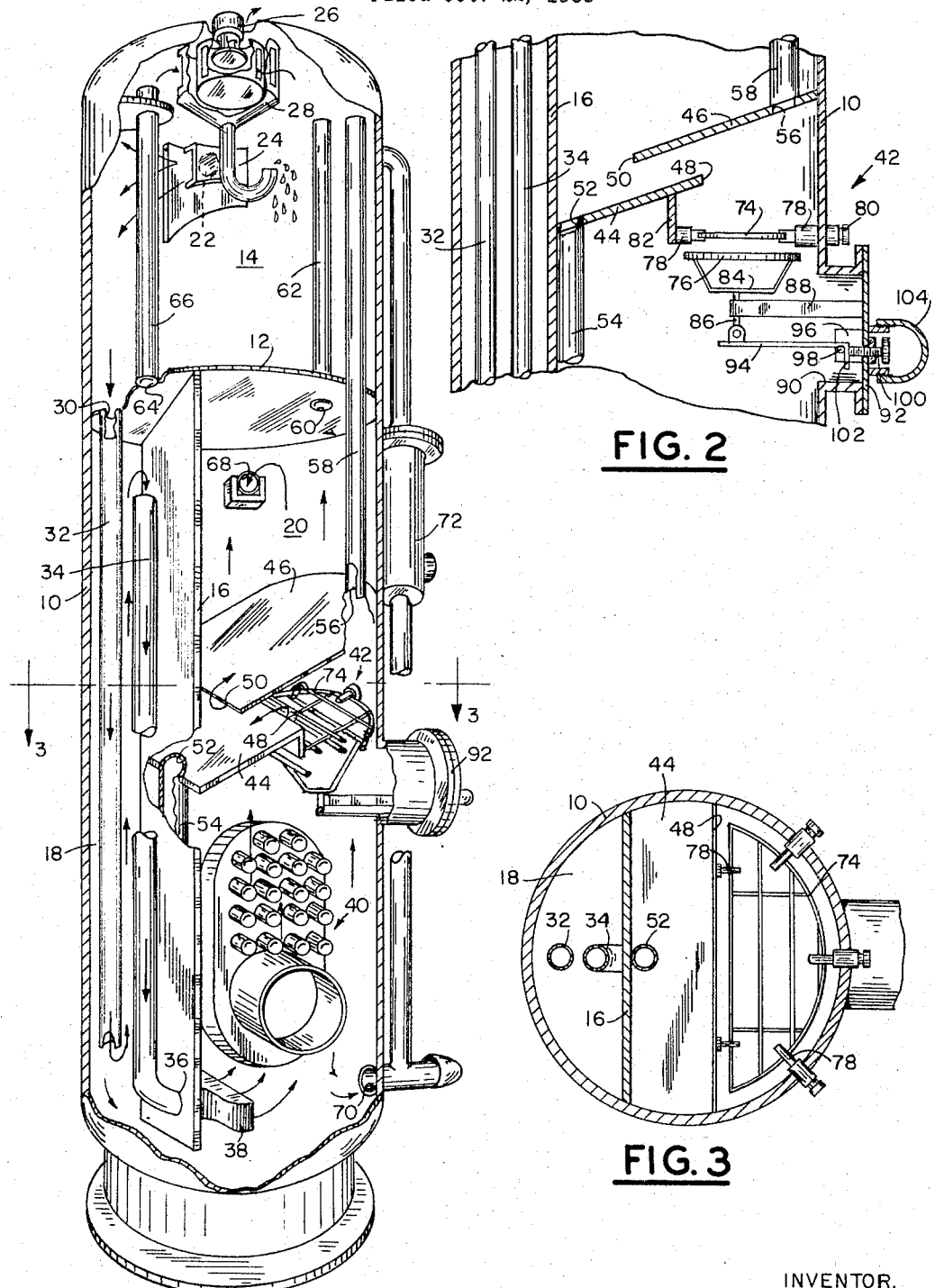
INVENTOR.
FORREST L. MURDOCK
BY *Head & Johnson*
ATTORNEYS

United States Patent Office 3,369,347
Patented Feb. 20, 1968

3,369,347
UP FLOW ELECTRIC EMULSION TREATER
FOR CRUDE OIL
Forrest L. Murdock, 2420 E. 24th St.,
Tulsa, Okla. 74114
Filed Oct. 22, 1965, Ser. No. 502,241
2 Claims. (Cl. 55—175)

This invention relates to an emulsion treater for crude oil. More particularly, the invention relates to an emulsion treater for crude oil including means of subjecting the crude oil emulsion to the combined treatment of heat and an electric field as the emulsion flows upwardly through the treater for improved separation of water and gas from the crude oil.

The use of treaters in the petroleum industry is well known. The basic purpose of a treater is to separate the water and gas which is normally entrained in various amounts with produced crude oil. Treating is basically accomplished by subjecting the crude oil to quiescent settling zones wherein the water is permitted to settle and the gas is permitted to rise. It is well known that heating the crude oil emulsion increases the rate and effectiveness of the water and gas removal, primarily by the effect of decreasing the viscosity of the emulsion so that the heavier water droplets can more freely settle to the bottom and gas bubbles can rise to the top. In addition, it has been known that subjecting crude oil emulsions to an electric field causes the water to more efficiently settle out of the emulsion by a process which is not completely understood but which is believed to occur because of the coalescence of the water droplets into larger heavier drops. This invention provides a unique arrangement in a treater providing multiple quiescent zones and an arrangement wherein the emulsion is treated as it flows upwardly, first past a heater, and then through an electric field for greatly improved effectiveness of water and gas extraction.

It is therefore an object of this invention to provide a treater for crude oil emulsions including means of subjecting the emulsion to the action of both heat and an electric field on the upward flow of the emulsion.

Another object of this invention is to provide a treater for treating crude oil emulsions for the removal of entrained gas and water therefrom including a more effective means of subjecting the emulsion to the effect of a heater and an electric field on the upflow of the emulsion through the treater in a manner wherein the electric field is more effectively utilized.

These basic objects and more particular objects will be understood by referring to the following description and claims taken in conjunction with the attached drawings in which:

FIGURE 1 is an external plan view of a treater according to this invention, the walls of the treater being broken away and the internal components shown in isometric view.

FIGURE 2 is an enlarged segmented view in cross-section showing more details of the electric grids utilized in the treater to subject the upward flow of emulsion to an electric field.

FIGURE 3 is a cross-sectional view taken along the line 3—3 of FIGURE 1 showing the details of the internal arrangement of the treater.

This invention may be described generally, but not by way of limitation, as a treater for crude oil emulsions including within an upstanding vessel means of subjecting the emulsion to a plurality of quiescent settling zones in an arrangement providing sequential changes of direction of fluids as it flows through the treater and particularly in an arrangemnet wherein the emulsion is subjected to the sequential effect of heating and an electric field as it flows upwardly through the treater.

Referring now to the drawings and first to FIGURE 1, an illustrative embodiment of the invention is shown, the embodiment being arranged in an upstanding closed vessel 10. A horizontal partition 12 divides the interior of the vessel into an upper gas separation chamber 14 and a lower water separation chamber which in turn is divided into two separate chambers by a vertical partition 16. The vertical partition 16 provides a vertical quiescent water extraction chamber 18 and a vertical treating chamber 20.

Vessel 10 has a crude oil inlet opening 22 covered by a distribution baffle 24, the opening communicating with the gas separation chamber 14. A gas outlet opening 26 is provided in the top of the vessel 10 and is the opening through which gas separated from the emulsion passes out of the treater. The gas outlet opening has communication with a mist extractor 28 for the removal of liquid droplets entrained with the gas.

When the crude oil flows into the vessel 10 through opening 22, it is first subjected to the gas separation chamber 14 which, in most field installations, is the first open area to which the crude oil emulsion extracted from beneath the earth is exposed. In the reduced pressure zone of gas separation chamber 14, most of the entrained gas leaves the emulsion.

An opening 30 in the horizontal partition 12 communicates with a downwardly extending pipe 32 which terminates at the lower end adjacent the bottom of the water extraction chamber 18. By means of pipe 32 the crude oil emulsion flows out of the gas separation chamber 14 and into the lower portion of water extraction chamber 18. As the crude oil emulsion leaves pipe 32, it reverses directions and flows upwardly, at a much lower velocity, in the vertical quiescent water extraction chamber 18. Water is extracted in chamber 18 in two ways, that is, first, by the reversal of direction of the emulsion flow which tends to extract entrained water droplets by centrifugal force, and, second, by the quiescent settling action afforded by the relatively slow upward movement of the emulsion in chamber 18. Water which is extracted in chamber 18 flows downwardly and settles in the bottom of vessel 10.

The emulsion passing upward in the water extracting chamber 18 enters the top of a downflow pipe 34. The lower end of downflow pipe 34 extends through an opening 36 in the lower portion of vertical partition 16 and communicates with a spreader 38 in the lower portion of treating chamber 20. As the emulsion leaves the spreader 38, it again reverses direction and flows upwardly through the quiescent treating chamber 20. Within chamber 20 is positioned a heater, generally indicated by the numeral 40, by which the temperature of the emulsion is raised. Heater 40 is of a type well known in the petroleum industry and may use either electric heat or heat from gas combustion, although in the majority of installations heater 40 is fired by natural gas.

As the emulsion rises past heater 40, the temperature thereof is increased, decreasing the viscosity, and permitting the heavier water droplets to more easily settle out to the bottom of vessel 10. The emulsion continues upwardly within treating chamber 20 past the heater 40 and through an electric field established by an electric grid system, generally indicated by the numeral 42, which will be subsequently described in greater detail.

Dividing the treating chamber 20 into an upper and lower portion is a baffle system consisting of an upwardly inclined lower imperforate baffle 44 and a downwardly inclined upper imperforate baffle 46. Baffles 44 and 46 are arranged overlapping, parallel to, and spaced from each other so that the upward flow of emulsion passes beneath the upper baffle 46, over the top of lower baffle 44, and upwardly over the top of upper baffle 46 into the upper portion of the treating chamber 20. Lower baffle 44 has one edge thereof affixed to the vertical partition 16 and extends upwardly terminating in an outer edge 48 which is spaced from the interior wall of the vessel 10 opposite the vertical partition 16. The upper baffle 46 is affixed to the interior wall of the vessel 10 opposite the partition 16 and extends in a downward inclination towards the partition 16 and terminates in an outer edge 50 which is spaced from the partition 16. The electrode grid system 42 is positioned between the outer edge 48 of lower baffle 44 and the interior wall of vessel 10.

An opening 52 is provided in the lower baffle 44 adjacent partition wall 16 and has communicating therewith a downwardly extending water conveying pipe 54. As the emulsion passes through the electrode assembly 42 and over the top of lower baffle 44, any water which drops out and falls upon baffle 44 will flow downwardly through opening 52 and pipe 54, the lower end of pipe 54 terminating in the lower portion of vessel 10 so that water is carried to the lower portion of the vessel. In addition, any water which settles out of the emulsion in the upper portion of the treating chamber 20 above upper inclined baffle 46 flows onto the inclined baffle, off the edge 50 thereof, and onto the upper surface of lower baffle 44 and is thereby carried through opening 52 and pipe 54 to the lower portion of the vessel 10.

An opening 56 is provided in the upper baffle 46 adjacent the interior wall of vessel 10 and receives a pipe 58 which extends upwardly through horizontal partition 12 and terminates at the upper end thereof adjacent the top interior of vessel 10. The function of opening 56 and pipe 58 is to permit any gas which leaves the emulsion in the lower portion of treating chamber 20 to pass upwardly into the top of gas separation chamber 14.

An opening 60 in horizontal partition 12 and a pipe 62 extending upwardly therefrom terminating adjacent the interior top of vessel 10 provides means for gas which is extracted from the emulsion in the portion of treating chamber 20 above baffles 44 and 46 to flow into the upper portion of gas separation chamber 14. In like manner, a second opening 64 in horizontal partition 12 and an upwardly extending pipe 66 communicates the upper portion of water extraction chamber 18 with the upper portion of gas separation chamber 14 so that any gas which is extracted from the emulsion in the water extraction chamber 18 can pass freely into the upper portion of gas separation chamber 14.

The crude emulsion which rises to the upper portion of the treating chamber 20 flows from the treater through oil outlet opening 68.

Water which is extracted from the emulsion and settles into the lower portion of vessel 10 is drawn out through water opening 70. Water may be extracted through opening 70 either by a float controlled arrangement (not shown) or by the use of a water syphon 72, a device well known in the petroleum industry and forming within itself no part of the improved upflow electric emulsion treater of this invention.

Referring to FIGURE 2, the details of the electric grid system 42 by which the emulsion is subjected to an electric field are best shown. The electric grid system 42 includes an upper or hot grid 74 and a lower or cold grid 76. The hot grid 74 is supported on insulators 78 and receives an electrical charge through an insulated conductor 80. To provide improved means of supporting insulators 78, a vertical support bracket 82 is affixed to the lower surface of lower baffle 44 adjacent the outer edge 48. The cold grid 76 rests on a supporting bracket 84. A vertically extending rod 86 is slidably received by the outer end of a support arm 88. To afford means of installing, repairing and inspecting the grid system 42, a manhole 90 is provided which is closed with a manhole cover 92. The arm 88 is secured to the interior of cover 92. The distance between the hot grid 74 and the cold grid 76 may be varied by means of a pivot arm 94 which is hinged to the interior of the manhole cover 92 by means of a pivot bracket 96 and pivot pin 98. A threaded bolt 100 engages a downwardly extending leg 102 of the pivot arm 94 to vary the angle of pivotation of arm 94 and, by means of rod 86, the elevation of cold grid 76. A cover 104 closes the opening through which bolt 100 extends to prevent leakage. By adjusting bolt 100, the distance between hot grid 74 and cold grid 76 may be varied and thereby the length of the electric field to which the emulsion is subjected may be varied. The intensity of the electric field is variable by the voltage supplied to hot grid 74 so that by varying the voltage and the space between the grids, the intensity of the electric field and the duration of time to which the emulsion is subjected to the field as it flows upwardly between the grids is controllable.

*Operation*

Crude oil emulsion extracted from below the surface flows into the treater through opening 22 and into the gas separation chamber 14. Here the crude is subjected for the first time to an open space and most of the entrained gas will rise out of the emulsion and gather at the top of the chamber 14. The crude flows downwardly through pipe 32 and into the bottom of water extraction chamber 18 where it reverses direction and flows slowly upwardly through the quiescent water extraction chamber 18 to the top of pipe 34. Here the crude changes direction and flows downwardly through the pipe and into the lower portion of treating chamber 20. The crude rises slowly in the quiescent treating chamber, first past heater 40 where the temperature of the emulsion is increased, lowering the viscosity and improving the effectiveness of gas and water separation. The emulsion as it flows upwardly encounters the baffle system, flowing first through the electric grid system 42 where the emulsion is subjected to an electric field causing additional water extraction by the coalescence of water drops. The emulsion, after passing through the electric grid system, flows over the top of lower baffle 44 and then over the top of upper baffle 46 into the upper portion of treating chamber 20. The emulsion finally passes out of the treater through oil outlet 68.

By the unique design of the treater of this invention, gas is free to escape from the emulsion in the gas separation chamber 14 upon first entering the treater; in the water extraction chamber 18 through opening 64 and pipe 66; in the lower portion of treating chamber 20 by passing through opening 56 in upper baffle 46 and pipe 58; and again in the upper portion of the treating chamber 20 through opening 60 in horizontal partition 12. Thus gas is gathered from all portions of the treater and conveyed into the upper portion of the gas separation chamber 14 where it is extracted through gas outlet 26.

Water is extracted in the treater, first, in the water extraction chamber 18 by the combined effect of flow direction reversal and quiescent settling; second, by the flow direction reversal discharge into the treating chamber 20; third, by settling in the lower portion of the treating chamber 20 in the presence of the heater 40 and the electric grid system 42; fourth, by flow direction reversal passage over the top of lower grid 44 and downwardly through opening 52 and pipe 54; and, finally, in the quiescent upper portion of treating chamber 20. Thus both gas and water are afforded a plurality of extraction exposures as the emulsion passes through the treater. The unique arrangement of this invention provides a treater wherein the flow is upwardly both through the heater and through the electric grid system and through flow direction changing inclined baffles in a treating zone separated both from the gas separation chamber and the water extraction chamber.

The invention has been described with a certain degree of particularity but it is manifest that many changes

What is claimed:

1. An emulsion treater for crude oil comprising:

an upstanding closed vessel having a cylindrical wall, a water outlet adjacent the bottom and a gas outlet adjacent the top;

a horizontal partition dividing the interior of the vessel into an upper and lower chamber, the upper chamber serving as a gas separation chamber and having said gas outlet therein, the vessel having a crude oil inlet communicating with said gas separation chamber;

a vertical partition dividing the lower chamber into a vertical water separation chamber and a vertical treating chamber, said vertical partition extending downwardly from said horizontal partition and terminating adjacent the bottom of the vessel, said horizontal partition having a crude outlet opening therein communicating with said water separation chamber, the vessel having an oil outlet opening communicating with the upper portion of said treating chamber;

means for conducting emulsion from the upper portion of said water separation chamber to the lower portion of said treating chamber;

a heater positioned in the lower portion of said treating chamber;

a lower imperforate baffle supported to said vertical partition and said vessel within said vertical treating chamber above said heater, said lower baffle having one edge affixed to said vertical partition and extending inclined upwardly therefrom terminating in an outer edge spaced from the interior wall of said vessel opposite said vertical partition, and an upper imperforate baffle above said lower baffle and below said oil outlet, said upper baffle having one edge affixed to the wall of said vessel and inclined downwardly toward said vertical partition and terminating in an outer edge spaced from said partition, said upper and lower imperforate baffles being substantially parallel to and spaced from each other and overlapping providing a flow direction changing path of fluid flow therebetween;

an upper horizontal substantially semi-elliptical perforate electrical grid positioned in insulated relationship between said lower imperforate baffle outer edge and the adjacent vessel interior walls;

a lower horizontal perforate grid parallel to and spaced from said upper grid and grounded to said vessel;

means of electrically charging said upper grid relative to said vessel and thereby said lower grid whereby an electrical field is created between said upper and lower grid through which crude oil emulsion passes as it flows upwardly in said treating chamber; means externally of said vessel for varying the horizontal spacing between said upper and lower grids.

2. An emulsion treater for crude oil according to claim 1 including bracket means extending substantially horizontally from said vessel interior wall supporting said lower grid and wherein said means of varying the spacing between said upper and lower grids includes means of varying the angle of said bracket relative to the horizontal.

References Cited
UNITED STATES PATENTS

| | | | |
|---|---|---|---|
| 1,838,913 | 12/1931 | Eddy | 204—304 |
| 1,838,978 | 12/1931 | Worthington | 204—308 |
| 2,681,311 | 6/1954 | De Wit | 204—302 |
| 2,785,766 | 3/1957 | Murdock | 55—175 X |
| 2,823,181 | 2/1958 | Packie et al. | 55—9 X |
| 3,207,686 | 9/1965 | Jarvis et al. | 204—308 X |

REUBEN FRIEDMAN, *Primary Examiner.*

R. W. BURKS, *Assistant Examiner.*